United States Patent
Maclean (10) Patent No.: US 9,970,165 B2
(45) Date of Patent: May 15, 2018

(54) STRUCTURAL FRAME

(71) Applicant: ECOS MACLEAN LTD, London (GB)

(72) Inventor: Nicholas Maclean, London (GB)

(73) Assignee: ECOS MACLEAN LTD, London (GB)

( * ) Notice: Subject to any disclaimer, the term of this patent is extended or adjusted under 35 U.S.C. 154(b) by 0 days. days.

(21) Appl. No.: 14/903,985

(22) PCT Filed: Jul. 8, 2014

(86) PCT No.: PCT/GB2014/052077
§ 371 (c)(1),
(2) Date: Jan. 8, 2016

(87) PCT Pub. No.: WO2015/004442
PCT Pub. Date: Jan. 15, 2015

(65) Prior Publication Data
US 2016/0160504 A1    Jun. 9, 2016

(30) Foreign Application Priority Data

Jul. 8, 2013   (GB) .................................. 1312238.7

(51) Int. Cl.
| E01D 6/00 | (2006.01) |
| F16B 7/00 | (2006.01) |
| E04C 3/28 | (2006.01) |
| E04C 3/29 | (2006.01) |
| E04C 5/07 | (2006.01) |

(Continued)

(52) U.S. Cl.
CPC .................. *E01D 6/00* (2013.01); *E04C 3/28* (2013.01); *E04C 3/291* (2013.01); *E04C 5/073* (2013.01); *F16B 7/00* (2013.01); *E01D 2101/40* (2013.01); *E04C 2003/0495* (2013.01)

(58) Field of Classification Search
CPC . E04C 5/073; E04C 3/291; E04C 3/28; E04C 2003/0495; E04C 3/08; E04C 2003/0491; E04H 12/10; F16B 7/00; F04C 2003/0486
See application file for complete search history.

(56) References Cited

U.S. PATENT DOCUMENTS

| 1,760,883 | A | * | 6/1930 | Moss | ...................... E04B 1/585 |
| | | | | | 29/897.31 |
| 1,806,639 | A | * | 5/1931 | Moltzan | .................... E04C 3/08 |
| | | | | | 29/897.31 |

(Continued)

FOREIGN PATENT DOCUMENTS

| CN | 10955 376 B | 8/2010 |
| FR | 2 826 990 A1 | 1/2003 |
| GB | 2 011 507 A | 7/1979 |

*Primary Examiner* — Adriana Figueroa
*Assistant Examiner* — Jessie Fonseca
(74) *Attorney, Agent, or Firm* — Andrew W. Chu; Craft Chu PLLC (57) ABSTRACT

A structural frame includes a plurality of members formed from fiber reinforced polymer. A pair of the members are arranged to engage one another at a first joint. The joint includes a notch that is provided in an outer surface of the first member of the pair of members and which is arranged to receive an end portion of the second member of the pair of members.

14 Claims, 8 Drawing Sheets

(51) Int. Cl.
*E04C 3/04* (2006.01)
*E01D 101/40* (2006.01)

(56) References Cited

U.S. PATENT DOCUMENTS

| | | | | |
|---|---|---|---|---|
| 6,026,626 | A * | 2/2000 | Fisher | E04C 3/08 |
| | | | | 52/28 |
| 6,065,267 | A * | 5/2000 | Fisher | E04C 3/08 |
| | | | | 52/655.1 |
| 6,082,068 | A | 7/2000 | Fisher | |
| 6,205,736 | B1 * | 3/2001 | Amborn | B21C 37/294 |
| | | | | 296/203.01 |
| 2004/0216249 | A1 | 11/2004 | El-Badry | |
| 2007/0011983 | A1 * | 1/2007 | Reynolds | E04B 1/19 |
| | | | | 52/633 |
| 2013/0312361 | A1 * | 11/2013 | Robinson | E04C 3/02 |
| | | | | 52/690 |
| 2014/0075877 | A1 * | 3/2014 | Robinson | E04C 3/08 |
| | | | | 52/690 |
| 2016/0102456 | A1 * | 4/2016 | Dietzen | E04C 3/04 |
| | | | | 52/693 |

* cited by examiner

STRUCTURAL FRAME

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a structural frame, suitable for use in the construction of self supporting structures, including but not limited to bridges, roofs, walls and floors.

2. Description of Related Art Including Information Disclosed Under 37 CFR 1.97 and 37 CFR 1.98.

The use of polymers, such as fibre reinforced polymers, in the construction of structures, such as roofs or bridges, is well known. Structures formed from fibre reinforced polymers are desirable since they have the advantage of being lighter than steel, almost the same strength as steel, low energy in production and more thermally efficient (in the case of roofs and walls).

To date all of these structures formed from polymer have simply replicated the equivalent construction in steel and have used extra material, plates and bolts to achieve the required stiffness and strength that is lost by the move away from steel.

The use of such bolted steel construction means has, however, had the effect of diminishing one of the major benefits of forming these structures from polymer, the weight advantage gained over a predominantly steel structure. In particular, because an increase in wall thickness is required to allow for such construction means.

The present invention arose in a bid to provide an improved structural frame for use in the construction of lightweight structures, which structural frame offers sufficient stiffness and strength whilst minimising weight.

BRIEF SUMMARY OF THE INVENTION

According to the present invention in a first aspect, there is provided a structural frame comprising a plurality of members formed from fibre reinforced polymer, a pair of the members being arranged to engage one another at a joint, the joint comprising a notch that is provided in an outer surface of the first member of the pair of members and which is arranged to receive a portion of the second member of the pair of members.

The use of a joint comprising a notch provides a unique connection of the material in compression. Moreover, such a joint allows for greater bearing area than bolted connections in material of the same wall thickness thus offering excellent strength in a lightweight structure.

The term fibre reinforced polymer is intended to cover any manmade fibre reinforced polymer. The fibre reinforced polymer is preferably a glass fibre or natural fibre reinforced polymer. The members may be formed by pultrusion. The fibres within the members are preferably substantially aligned with the longitudinal axes of the members.

The members are preferably hollow. The members may have a rectangular cross section. The wall thickness of the members may be constant or may vary from one wall to another. The wall thickness of the wall or walls provided with a notch may be increased relative to the remaining walls. Each of the members is preferably unitarily formed. Each of the members may be of uniform cross section along its entire length.

The notch in the first member is preferably arranged to receive an end portion of the second member. The notch in the first member is preferably shaped to conform to a corner of the second member that is received thereby. The notch may be substantially wedge or V-shaped and receive a corner edge of the second member. The walls of the notch may be at 90 degrees to each other and the corner of the second member may be square. In alternative arrangements, the notch may be rounded to correspond to a rounded corner edge of the second member.

By virtue of the notch the second member is supported directly by the first member. Load may be transferred directly through the first and second members.

The notch is preferably formed by indenting the polymer prior to hardening. Where the member provided with the notch is hollow, the notch is preferably shallower than the depth of the wall of the member in which the notch is provided. In alternative arrangements, the notch may be provided in an insert made of metal or similar that is incorporated into the first member.

The members are preferably arranged at an oblique angle to one another. Multiple pairs of the first and second members may be arranged between a pair of spaced apart fibre reinforced polymer chords.

A prestressing means may be provided, which is arranged to apply a force to the structural frame to maintain each of the members in compression in its unloaded condition and to limit load reversals.

Fibre reinforced polymers have disadvantageous elastic properties, which are overcome by the prestressing means to induce compression and thereby enhance the performance of the material.

According to the present invention in a further aspect, there is provided a structural frame comprising a first chord, a second chord and a plurality of members extending therebetween so as to form a plurality of triangular units, wherein the first and second chords and the plurality of members are formed from fibre reinforced polymer and a prestressing means is provided, which is arranged to maintain the structural frame in a state of compression.

According to the present invention in a further aspect, there is provided a structure comprising one or more of the structural frames as detailed above. The structure may comprise a bridge, ceiling, wall or floor.

Further preferred features according to the present invention are presented in the dependent claims.

BRIEF DESCRIPTION OF THE SEVERAL VIEWS OF THE DRAWINGS

Non-limiting embodiments will now be described, by way of example only, with reference to the accompanying drawings.

DETAILED DESCRIPTION OF THE INVENTION

Figure 1:
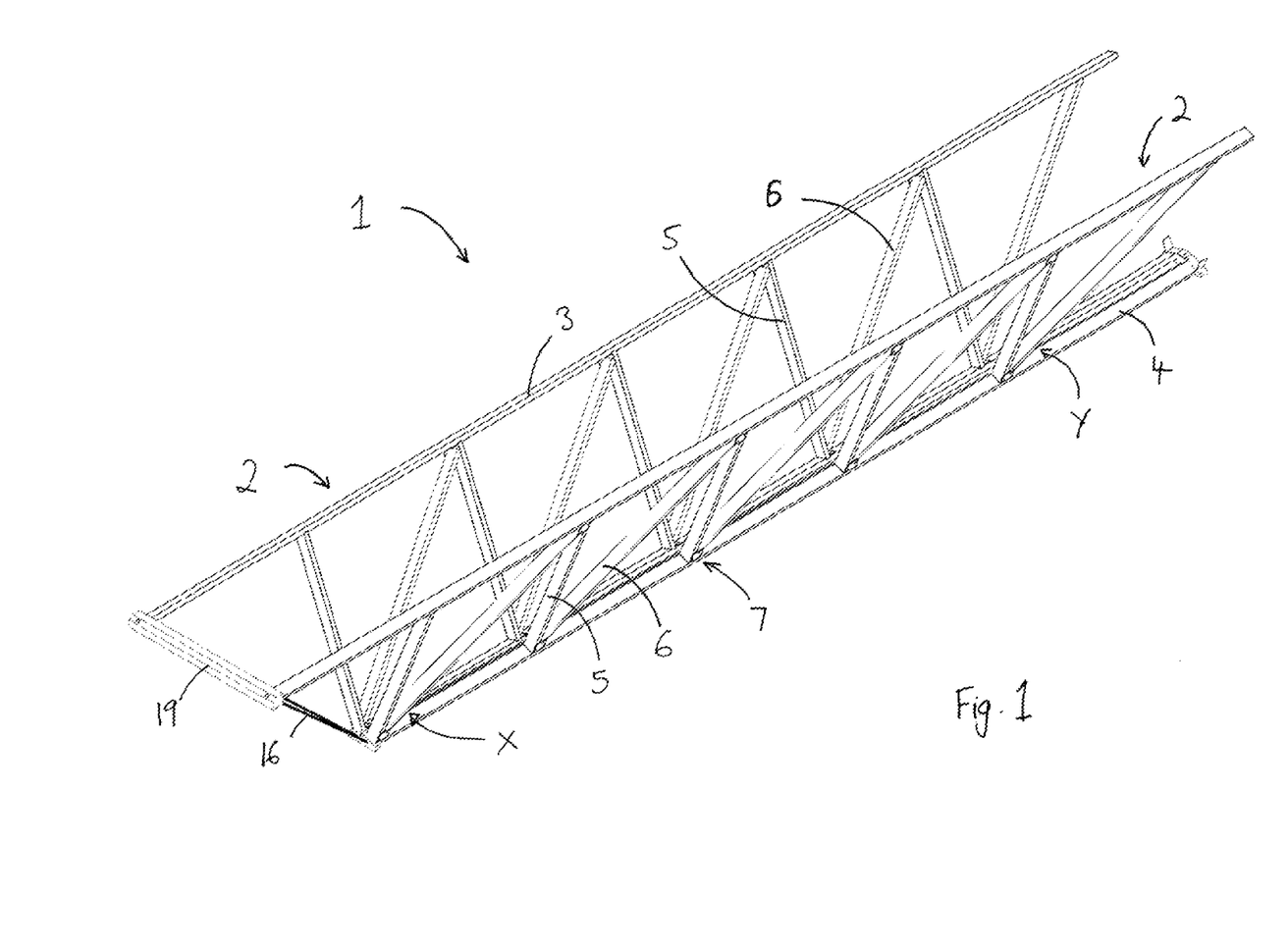
FIG. 1 shows an isometric view of a structural frame in accordance with the present invention, which forms a section of the structure of a lightweight bridge.

With reference to FIG. 1 there is shown a structure 1 that comprises a pair of trusses (structural frames) 2. The structure here forms part of the structure of a bridge (not shown in full), which is described in further detail below.

Each of the trusses 2 comprises a first (upper) chord 3 and a second (lower) chord 4 and a plurality of members 5, 6 that are arranged between the chords. A single truss (structural frame) is now described in detail. It should be noted that the truss, as described, may be used in alternative structures and may be modified from the described form.

The chords 3, 4, as shown, extend substantially parallel to one another. It should be appreciated, however, that this need not be the case. Whilst the chords are shown to be straight, prestressing means are preferably provided (as described below) which may apply a curvature to the chords. The degree of curvature will depend on the end use of the truss. The prestressing may result in one of the chords having a different curvature to the other. Chord structures may be provided that have non-parallel chords and such structures will be readily appreciated by those skilled in the art.

The members comprise first members 5, which are arranged substantially perpendicular to the upper and lower chords (i.e. they extend vertically, as the structure is viewed) and second members 6, which are arranged at an oblique angle to the first members 5 (i.e. they extend diagonally as the structure is viewed). The second members 6 may be arranged at an angle of around 45 degrees to the first members 5.

In the present arrangement, the first and second members 5, 6 are arranged in pairs. It should be appreciated that in alternative arrangements this need not be the case.

The chords 3, 4 and members 5, 6 are all formed from fibre reinforced polymer. The fibre reinforced polymer may be a glass fibre or natural fibre reinforced polymer. Any or all of the chords and members may be formed by pultrusion. It is the preferred means of forming these elements, since when formed from a fibre reinforced polymer by pultrusion, the fibres within the chords and members are substantially aligned with the longitudinal axes of these elements, which provides these elements with great strength in tension.

The chords 3, 4 and members 5, 6 all preferably have a rectangular cross section and are hollow to limit their weight. As will be readily appreciated by those skilled in the art, alternative profiles are possible for the chords and members, including but not limited to circular and triangular profiles. The wall thickness of the chords and members may be constant or may vary from one wall to another, in particular, the wall thickness of the wall or walls provided with a notch, as discussed below, may be increased relative to the remaining walls. Each of the chords and members is preferably unitarily formed. Each of the chords and members is preferably of uniform cross section along its entire length.

In each pair of the first and second members, the first and second members are arranged to engage one another at a first joint 7, which comprises a notch 8 that is provided in an outer surface of the first member 5 and which is arranged to receive an end portion of the second member 6. The first joint 7 is shown most clearly in FIGS. 2a and 2c. As may be seen, the notch 8 is substantially wedge or V-shaped and receives a corner edge 6',6" (having a side 6' and another side 6") of the second member 6. The walls 8', 8" (first wall 8', second wall 8") of the notch are at 90 degrees to each other (to correspond to the profile of the corner at vertex 8'" of the second member 6 received by the notch and provide an effective engagement therewith). By virtue of the notch the lower end of the second (diagonal) member 6 is supported directly by the first (vertical) member 5. Load may be transferred directly through the members 5, 6.

Figure 2:
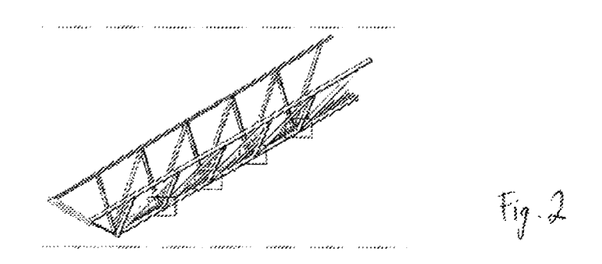
FIG. 2 shows a detailed perspective view of a first joint of the structure of FIG. 1, with FIG. 2a providing an isometric view and FIGS. 2b and 2c providing front and rear views respectively.
Figure 2A:
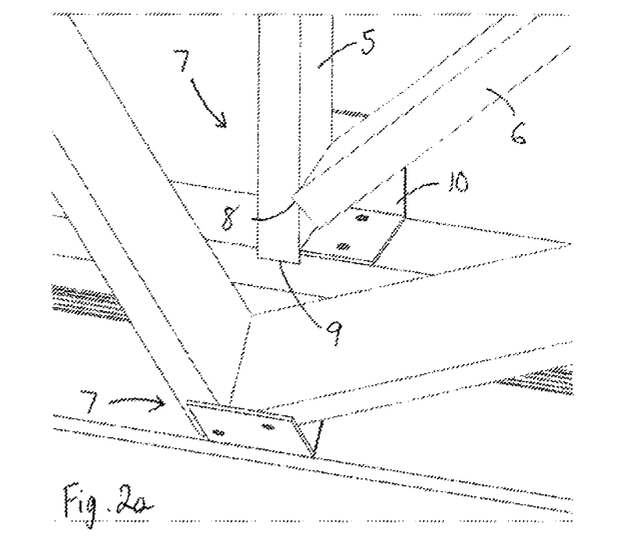
Figure 2B:
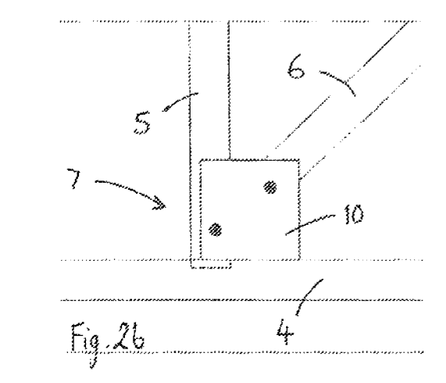
Figure 2C:
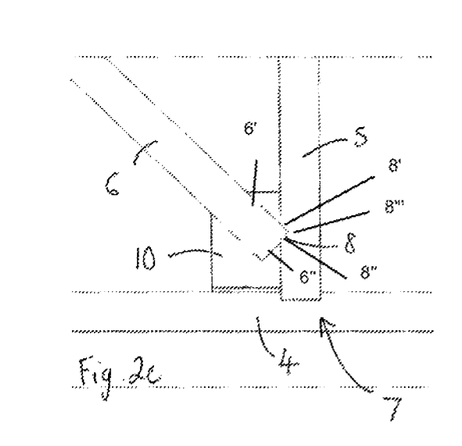

The notch is preferably formed by indenting the polymer prior to hardening. It will be readily appreciated, however, that alternative means of forming the notch may be implemented, including machining. Indenting is preferred, since the strength of the member is then not diminished by formation of the notch. The notch is preferably shallower than the depth of the wall of the member in which the notch is provided. In alternative arrangements the notch may be provided in an insert made of metal or similar that is incorporated into the first member 5. Whilst the notch is shown to be square, in alternative arrangements it may be rounded with the edge of the second member 6 correspondingly rounded.

The first joint preferably additionally comprises a further (third) notch 9 that is provided in the bottom chord 4 and which is arranged to receive the bottom end of the first member 5. The third notch may be formed as detailed above for the first notch, by indenting or otherwise. The third notch differs from the first notch predominantly in its shape. It is not wedge shaped but square and locates and fixes the first member 5 perpendicular to the bottom chord 4.

The first joint finally comprises a fixing element 10, which is arranged to hold the first and second members 5, 6 and the bottom chord 4 together at the first joint 7. The fixing element 10, as shown, comprises a substantially L-shaped plate that is fixed by bolts to each of the elements that meet at the first joint 7. The plate is a lightweight element and may be attached using suitably small bolts, since it acts simply to prevent the elements of the structure becoming misaligned with one another at the first joint 7 when the structure is being moved or otherwise manipulated, or to resist small load reversals during use. Various other forms of fixing element will be readily appreciated by those skilled in the art. In some situations it may be possible to omit the fixing element altogether.

With reference to the first pair of members 5, 6 (labelled X in FIG. 1) only, the opposite, upper, end of the first member 5 is received in a notch that is provided in the upper chord and is substantially identical to the above described third notch of the first joint 7. This notch is again square and supports the first member 5 with its end face parallel to the upper chord and its longitudinal axis perpendicular to the longitudinal axis of the upper chord. A similar fixing element is preferably provided to maintain alignment. For the remaining pairs of first and second members 5, 6, the upper ends of the first members 5 are received by second joints, as detailed below.

Figure 3:
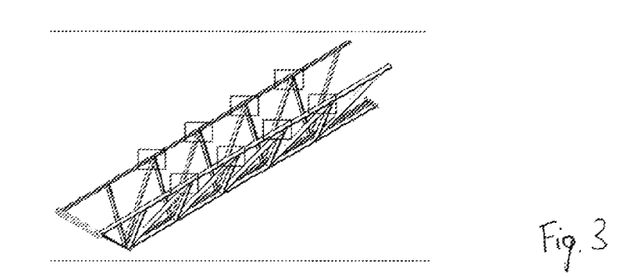
FIG. 3 shows a detailed perspective view of a second joint of the structure of FIG. 1, with FIG. 3a providing an isometric view and FIGS. 3b and 3c providing front and rear views respectively.
Figure 3A:
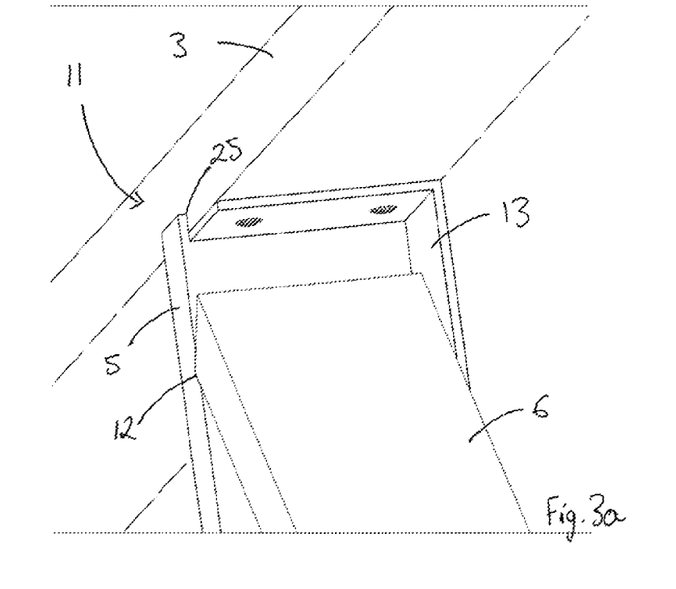
Figure 3B:
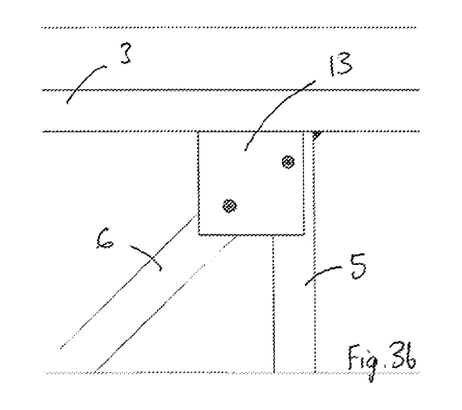
Figure 3C:
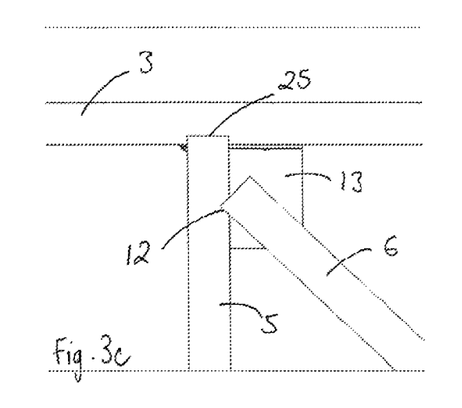

With reference to all but the final pair of members 5, 6 (labelled Y in FIG. 1), the opposite, upper, end of the second (diagonal) member 6 engages the first member 5 of the adjacent pair of first and second members at a second joint 11 that is essentially a mirror image of the first joint 7. The second joint 11 is most clearly shown in FIGS. 3a and 3c. The second joint comprises a wedge shaped (second) notch 12 that is provided in an outer surface of the first member 5 of the adjacent pair of first and second members on the opposite side of that first member 5 to the notch 8 (of the first joint) provided therein. A square (fourth) notch 25, which corresponds to the third notch of the first joint, is provided in the upper chord as part of the second joint. Again as with the first joint 7 a fixing element 13 is preferably provided, as shown. The discussions of the further details of the first joint 7 and possible alternatives thereto are all directly applicable to the second joint and are not repeated here.

Figure 4:
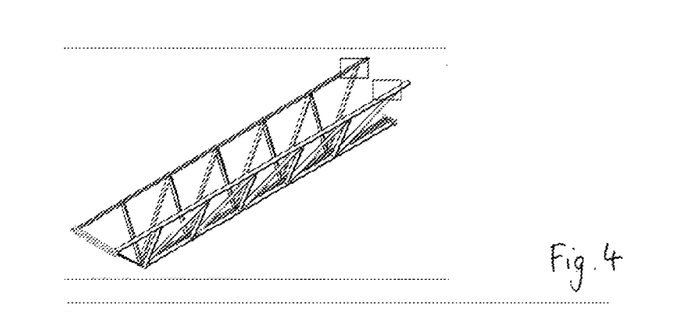
FIG. 4 shows a detailed perspective view of an end joint of the structure of FIG. 1, with FIG. 4a providing an isometric view and FIGS. 4b and 4c providing front and rear views respectively.
Figure 4A:
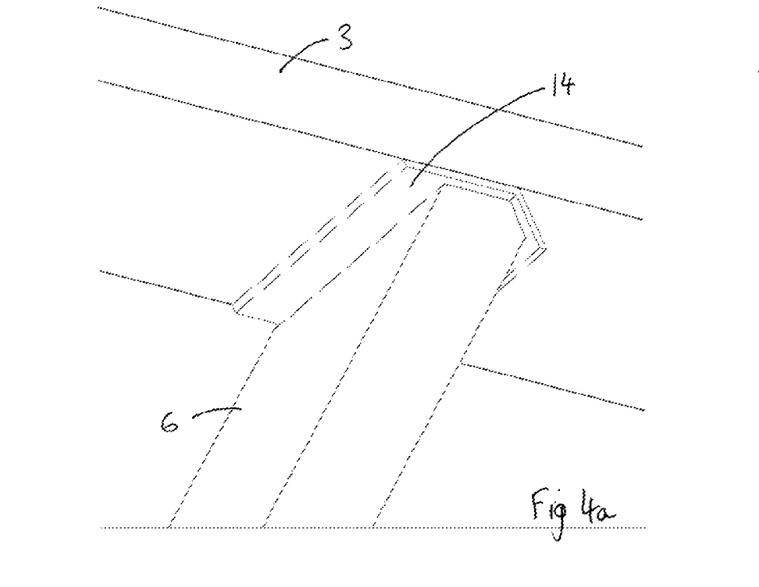
Figure 4B:
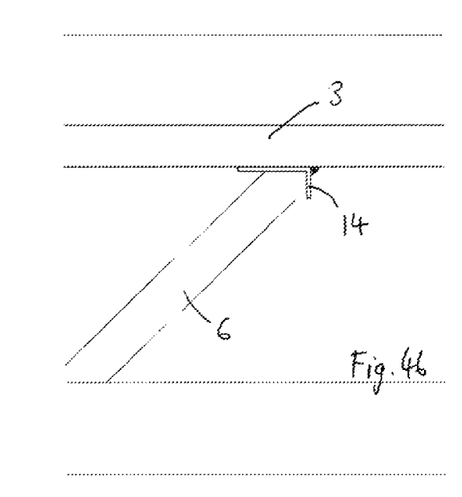
Figure 4C:
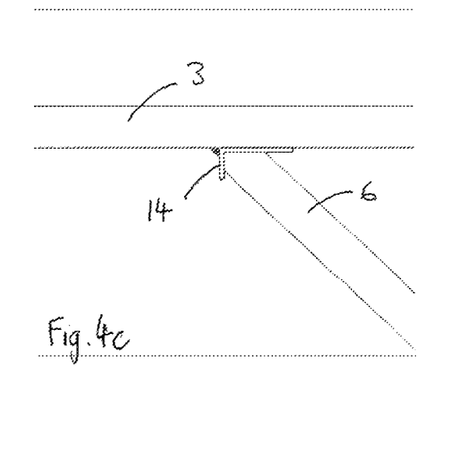

With reference to the final pair of members 5, 6 (labeled Y in FIG. 1) only, the opposite, upper, end of the second (diagonal) member 6 engages the upper chord 3, as shown most clearly in FIG. 4 and is joined thereto by a fixing element 14, which again comprises a substantially L-shaped plate that is attached to both the upper chord 3 and the second member 6. As will be readily appreciated, numerous alternative means of attaching the second member 6 to the upper chord exist.

With reference to FIGS. 1, 5, 6 and 7, there is shown a prestressing means, which comprises a prestressing element 15 that comprises a cable or rod, which extends along the length of the bottom chord 4, and a tension element 16, which again comprises a cable or rod, and which extends from adjacent the end of the bottom chord 4 to adjacent the end of the upper chord 3. The tension element 16 transmits force between the upper and lower chords. In the present arrangement the upper chord is longer than the bottom chord. It should be appreciated that in alternative arrangements the opposite may be true or the upper and bottom chords may be the same length. The tension element 16 extends at an oblique angle relative to the respective first member of the first (end) pair of first and second members (labeled A in FIG. 1), from a point adjacent the first joint 7, to thereby form a triangular unit.

The arrangement of the adjacent pairs of first and second members, as detailed above and most clearly seen in FIG. 1, provides a continuous series of triangular units. The present arrangement uses the strength of the selected polymer in tension by providing an arrangement of elements (members 5, 6, chords 3, 4) which transfer load into the members which are in tension. Tension is provided both by the connection of the second (diagonal) members 5 to the first (vertical) members 6 and to the bottom chord 4 of the truss. In addition, as detailed above and discussed further below in the context of the described bridge arrangement, a prestressing mechanism is preferably provided to compress the truss from end to end running along the line of the bottom chord 4.

With specific reference to the structure shown in FIG. 1, there is shown one half of a bridge section, which comprises a pair of trusses 2 joined together in a V-shape (as viewed from the end of the structure). The trusses 2 are in alignment with one another (as viewed from the side of the structure) and extend in parallel to one another with the bottom chords of the two trusses and the upper chords of the two trusses joined to one another. The bottom chords 4 are closer to one another than the upper chords 3, which achieves the V-shape. The bottom chords are preferably closer together at one end than at the other end, as again shown in FIG. 1.

Figure 6:
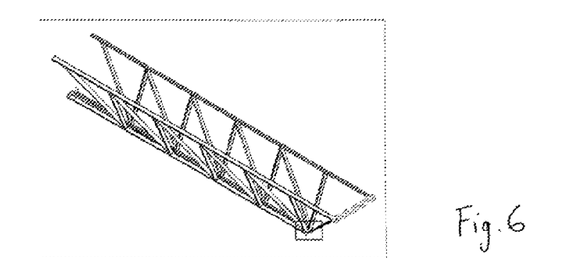
FIG. 6 shows a detailed perspective view of a prestressing block of the structure of FIG. 1, with FIG. 6a providing an isometric view and FIGS. 6b and 6c providing front and side views respectively.

FIG. 6 shows how the cable or rod comprising the prestressing element 15, which is provided at the bottom of the structure, passes between the two bottom chords 4 and through a block 17 of polymer, or other material, including but not limited to metal or hardwood. The block may be formed from fibre reinforced polymer. The block is preferably solid. The block is used to join the bottom chords together. The prestressing element 15 is tightened by means of a bolt 18 on the outer face of the polymer block.

Figure 5:
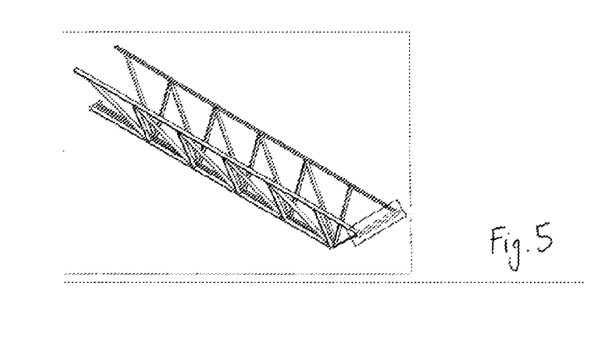
FIG. 5 shows a detailed perspective view of an end support joint and upper horizontal member of the structure of FIG. 1, with FIG. 5a providing an isometric view and FIGS. 5b and 5c providing front and side views respectively.
Figure 5A:
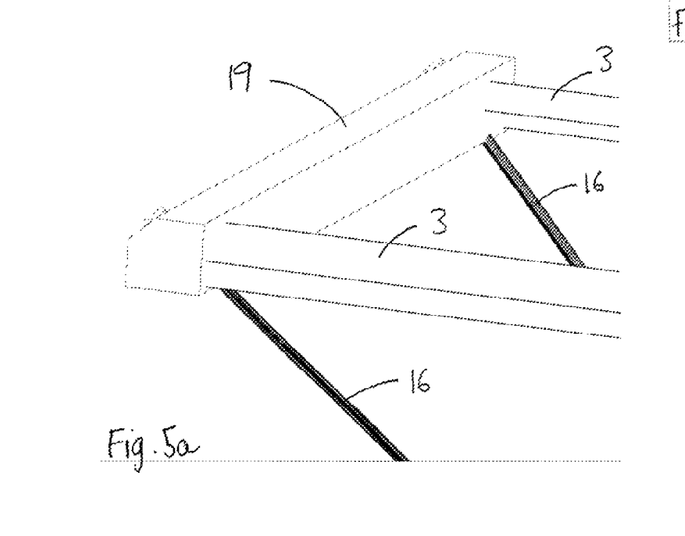
Figure 5B:
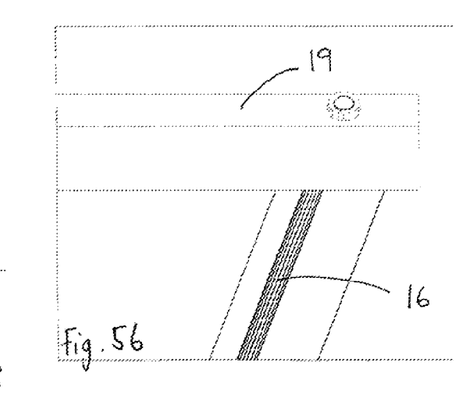
Figure 5C:
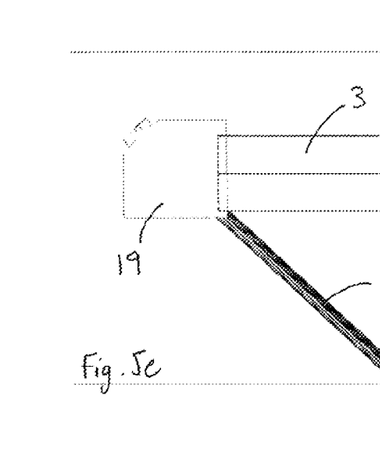
Figure 6A:
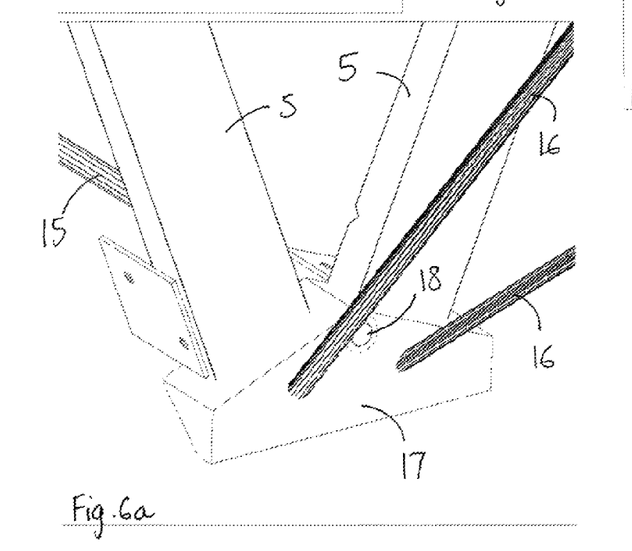
Figure 6B:
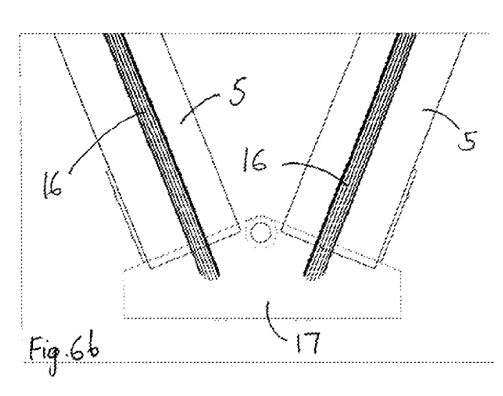
Figure 6C:
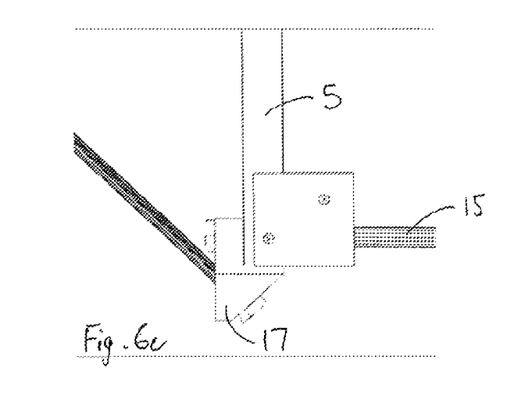

The tension elements 16 pass through the lower block 17, as clearly shown in FIG. 6a and through an upper horizontal member 19 (shown in FIGS. 5a to 5c), which may comprise a solid or hollow block formed from fibre reinforced polymer, metal or hardwood, and which joins the upper chords together and in spaced relation to one another. The tension elements 16 simply transfer the load up to the horizontal member 19, which may be considered to be a support. The tension elements 16 are bolted at both ends, as seen most clearly in FIGS. 5c and 6c. The upper horizontal member (support) that is joined to both of the upper chords may provide a bearing member for the bridge at its end.

Figure 7:
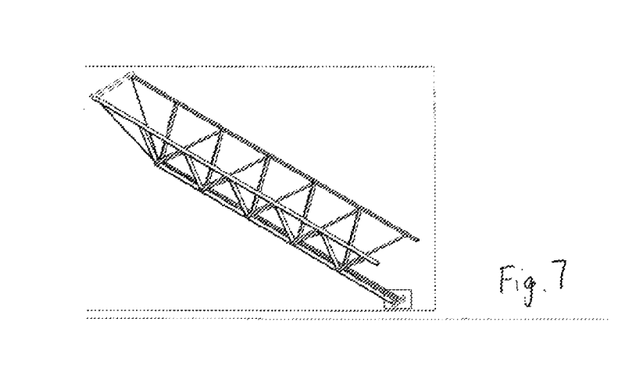
FIG. 7 shows a detailed perspective view of an intermediate prestressing block of the structure of FIG. 1, with FIG. 7a providing an isometric view and FIGS. 7b and 7c providing front and side views respectively.
Figure 7A:
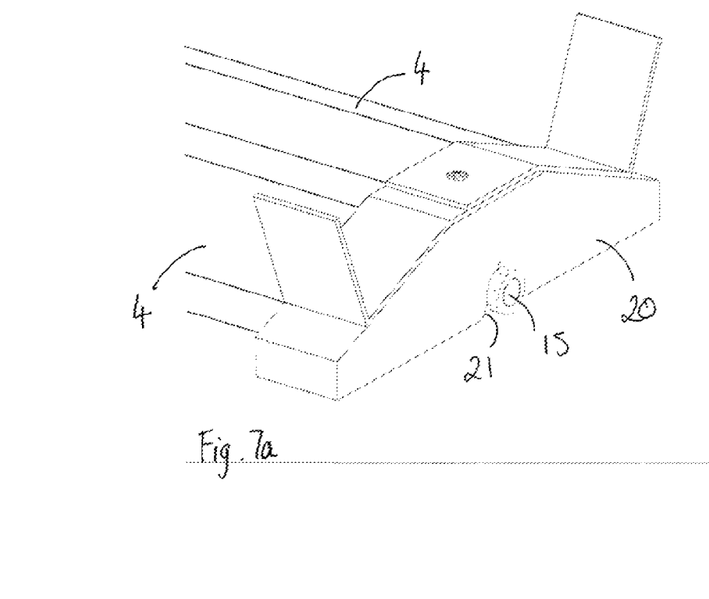
Figure 7B:
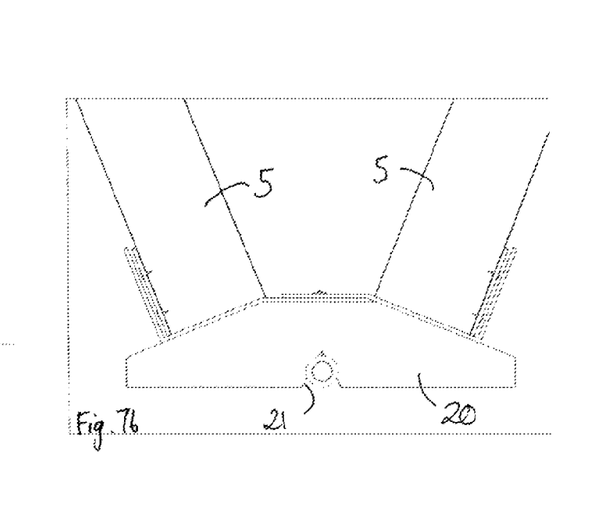
Figure 7C:
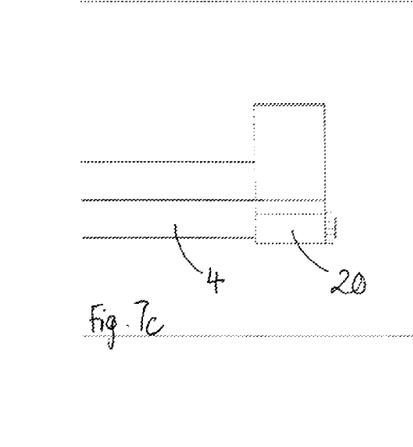

FIG. 7 shows the opposite end of the prestressing element 15 bolted to a further block 20, which again preferably comprises a solid fibre reinforced polymer block but may alternatively be hollow and/or manufactured from metal or hardwood. The block is arranged such that it may be connected by a sleeve coupler or turn buckle to the next section of the bridge. (Two sections are shown joined together in FIG. 8). Clearly in alternative arrangements, such as where the structural frame is not for inclusion in the structure of a bridge or where the bridge comprises a single structure 1 only, this aspect may be omitted. The block 20 is provided with a slot 21 for receiving the prestressing element 15, as shown.

The bottom chords of the structure 1 are preferably spaced further apart from one another at one end of the structure than at the other, such that they are non-parallel. As seen in FIG. 1, the lower chords 4 are closer together at the block 17 than at the block 20.

The prestressing of the bottom chords creates a curve in the horizontal plane which helps to stabilise the bridge. This is enhanced when the lower chords of the structure are non-parallel, as mentioned above. Both aspects provide some torsional buckling resistance.

As previously mentioned, further prestressing mechanisms will be readily appreciated by those skilled in the art and the present arrangement is not to be limited to the specific prestressing arrangement discussed herein.

Figure 8:
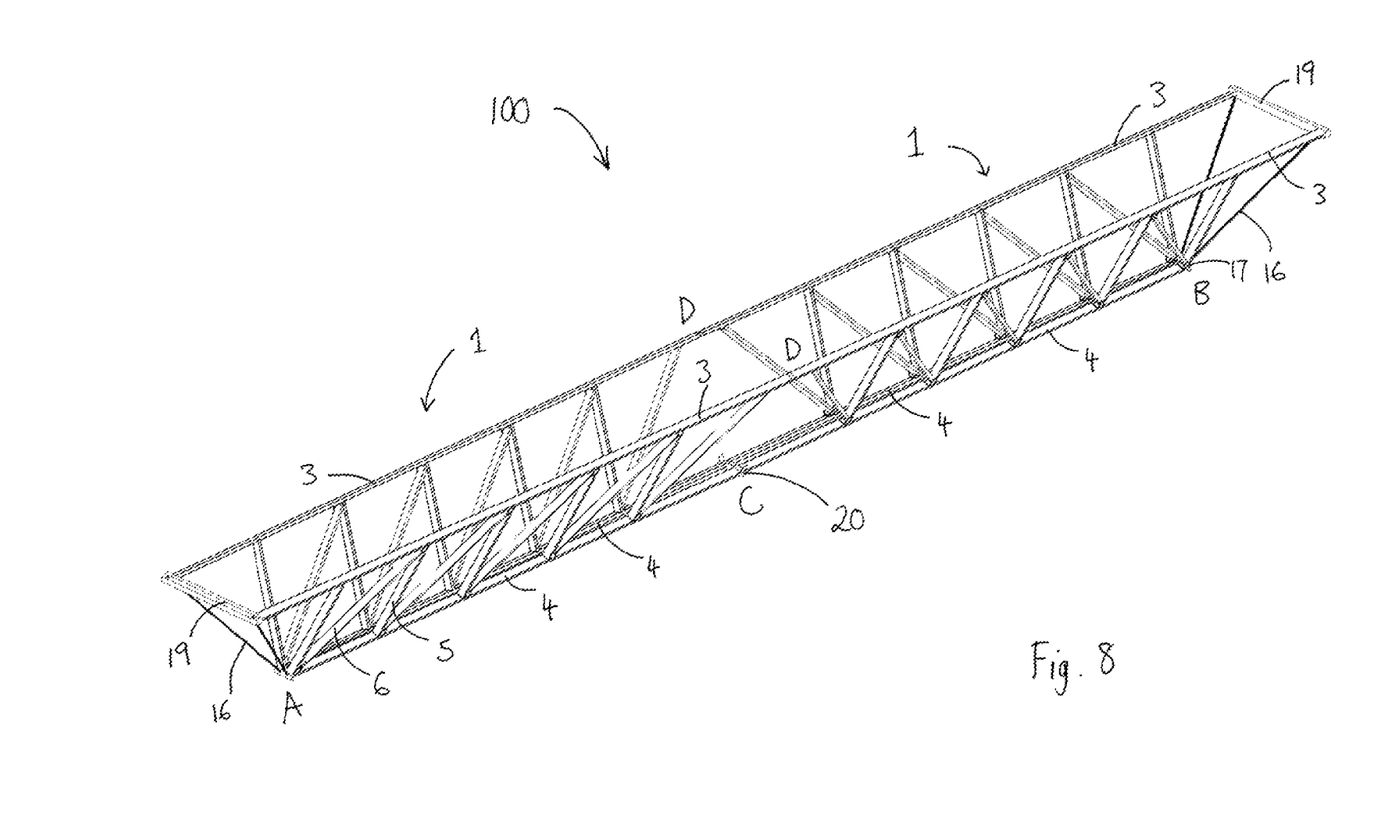
FIG. 8 shows an isometric view of a bridge track, which forms part of the structure of a lightweight bridge, the bridge track comprising a pair of the structural frames shown in FIG. 1 joined end to end.

Two of the structures pictured in FIG. 1, when joined end to end, may form a single span bridge track. Such a single span bridge track 100 is shown in FIG. 8. The bridge track has a first end A and a second end B, as seen in FIG. 8. Whilst the bridge track 100 is shown to comprise a pair of the structures it should be appreciated that a bridge track may comprise a single structure only or more than two structures, wherein any required modifications to the structures to achieve such alternative arrangements will be minor only and will be readily appreciated by those skilled in the art.

With reference to FIG. 8, each of the upper chords 3 of the first structure (the left hand structure as viewed in FIG. 8) is joined end to end with a corresponding one of the upper chords of the second structure (the right hand structure as viewed in FIG. 8) at a point D, as shown. Each of the lower chords 4 of the first structure is provided end to end with a corresponding one of the lower chords 4 of the second structure, wherein these lower chords extend to or to adjacent to a point C along the axial length of the bridge track 100, as shown. Here the point C is the midpoint of the bridge track along its axial length, since the first and second supports are identical in structure to one another. The second structure comprises a mirror image of the first structure. The bottom chords 4 of each of the first and second structures are spaced further apart from one another at the midpoint of the bridge along its axial length than at the ends of the bridge, which as mentioned assists in preventing torsional buckling.

The pair of the structures 1 may be joined end to end, as shown in FIG. 8, by joining the top and/or bottom chords by insertion of a solid polymer section, preferably formed of fibre reinforced polymer, which fits inside the hollow section of the chords placed end to end. The hollow section may be glued into one of the chords and secured in the other chord placed end to end with that chord by screwing so that the two sections may be separated from one another for transport/storage. The same method may be applied when more than two structure are joined end to end.

In the completed bridge a pair of the single span bridge tracks 100 would be provided side by side, wherein, for example, a left bridge track may support the left side wheels of a vehicle whilst the right side bridge track may support the right side wheels of the vehicle.

In some circumstances it may be desirable to provide a cross bracing arrangement using steel rods, or similar, to connect the top chord of one bridge track to the bottom chord of the adjacent bridge track to resist the twisting action of the structure as a load moves off centre along the bridge, and further improve torsional buckling resistance.

For supporting the load travelling over the bridge, the top parallel cords are designed to support a decking made of reinforced polymer grid or steel grid, or similar. The grid can either sit across the top of the cords or be supported on steel rods, or similar elements, which pass through the diagonal members so creating a line of decking with a kerb on either side, which comprises the upper chords, to guide wheels and counteract overturning. Clearly numerous alternative load supporting arrangements will be readily appreciated by those skilled in the art. In particular, a single decking could be provided to span a pair of the bridge tracks.

Whilst the specifically described arrangement relates to a structural frame (truss) and to a bridge comprising a number of the structural frames, it should be appreciated that structural frames in accordance with the present invention may be used in numerous alternative structures, including but not limited to roofs, walls and floors, which may be curved or flat in dependence on the prestressing arrangement implemented.

I claim:

1. A structural frame, comprising:
a plurality of pairs of members of pultruded fiber reinforced polymer,
wherein each pair of members are arranged between a pair of spaced apart fiber reinforced polymer chords,
wherein each pair of members is comprised of a first member and a second member, said first member and said second member engaging one another at a first joint, said first joint comprising a notch being comprised of a first wall and a second wall, said first wall being set at an angle to said second wall at a vertex, said notch being provided in an outer surface of said first member of each pair of members, said first wall arranged to receive a side of a corner edge of an end portion of the second member, said second wall arranged to receive another side of said corner edge of the second member, said corner edge being fit to said vertex,
wherein each first member of each pair of members extends parallel to one another and perpendicular to the pair of chords,
wherein each first member has a first end joined to one chord of the pair of chords and a second end joined to a respective remaining one chord of the pair of chords, and
wherein said angle of said first wall to said second wall at said vertex is at an oblique angle to a longitudinal axis of said first member.

2. A structural frame, as claimed in claim 1, wherein said first member and said second member of each pair of members are arranged at an oblique angle to one another.

3. The structural frame, as claimed in claim 1, wherein said plurality of pairs of members comprise adjacent pairs of members engaging one another through second joints, wherein each second joint comprises another notch provided in another outer surface of said first member opposite said notch of each first joint, said another notch being arranged to receive an end portion of an adjacent second member of one of the adjacent pair of members, said end portion of said adjacent second member being on an opposite side of said first member to said end portion of said second member received in said respective first joint.

4. The structural frame, as claimed in claim 3, wherein said adjacent pairs of members form a continuous series of triangular units.

5. The structural frame, as claimed in claim 1, wherein said plurality of pairs of members comprises an end pair of members, said end pair of members being comprised of an end second member engaging said one chord of said pair of spaced apart fiber reinforced polymer chords opposite said remaining one chord engaged to one of said first members at said respective first joint.

6. The structural frame, as claimed in claim 1,
wherein said first end is joined to said one chord of the pair of chords through a first further notch,
wherein said first joint is formed at said first end,
wherein said second end is joined to said respective remaining one chord of the pair of chords through a second further notch,
wherein each first member is comprised of another notch provided in another outer surface of each first member opposite said notch of said respective first joint, said another notch forming a second joint, and
wherein said second joint is formed at said second end.

7. The structural frame, as claimed in claim 1, further comprising: a fixing element attached to at least one of said pair of members and attached to at least one chord of the pair of chords.

8. The structural frame, as claimed in claim 1, further comprising: a prestressing element arranged to apply a force to maintain each member of said pair of members in compression, said prestressing element extending along a length of one of the chords.

9. The structural frame, as claimed in claim 8, further comprising: a tension element extending between adjacent ends of each chord of the pair of chords.

10. The structural frame, as claimed in claim 9,
wherein said tension element extends between adjacent ends of each chord of the pair of chords from a first point on said one chord of the pair of chords, said first point being adjacent to said first joint of an end pair of said plurality of pairs of members to a second point on said remaining one chord of the pair of chords adjacent to an end of a chord of another pair of spaced apart fiber reinforced polymer chords, said another pair of spaced apart fiber reinforced polymer chords being set at an oblique angle to said pair of spaced apart fiber reinforced polymer chords.

11. The structural frame, as claimed in claim 1, wherein each first member has a rectangular cross-section, wherein each second member has a rectangular cross-section, and wherein each chord of the pair of chords has a rectangular cross-section.

12. The structural frame, as claimed in claim 1, wherein said angle of said first wall to said second wall is a right angle.

13. The structural frame, as claimed in claim 1, wherein each first member is hollow and has a first member wall thickness, wherein each second member is hollow and a second member wall thickness, wherein chord of the pair of chords is hollow and has a chord wall thickness, wherein said first notch is shallower than said first member wall thickness, and wherein said first notch is shallower than said chord wall thickness.

14. The structural frame, as claimed in claim 1, wherein each chord of the pair of chords extends substantially parallel to one another.

\* \* \* \* \*